United States Patent
Taylor, III et al.

(10) Patent No.: US 10,885,067 B2
(45) Date of Patent: Jan. 5, 2021

(54) DATA GATHERING AND DATA RE-PRESENTATION TOOLS

(71) Applicants: W. C. Taylor, III, Toms River, NJ (US); Michael S. Ackerman, Morris Plains, NJ (US); Devlin P. McConagly, Columbus, NJ (US)

(72) Inventors: W. C. Taylor, III, Toms River, NJ (US); Michael S. Ackerman, Morris Plains, NJ (US); Devlin P. McConagly, Columbus, NJ (US)

( * ) Notice: Subject to any disclaimer, the term of this patent is extended or adjusted under 35 U.S.C. 154(b) by 291 days.

(21) Appl. No.: 16/134,490

(22) Filed: Sep. 18, 2018

(65) Prior Publication Data
US 2019/0087483 A1    Mar. 21, 2019

Related U.S. Application Data

(63) Continuation of application No. 13/737,844, filed on Jan. 9, 2013, now Pat. No. 10,078,685.

(60) Provisional application No. 61/584,483, filed on Jan. 9, 2012, provisional application No. 61/584,497, filed on Jan. 9, 2012.

(51) Int. Cl.
| | |
|---|---|
| *G06F 16/28* | (2019.01) |
| *G06Q 50/18* | (2012.01) |
| *G06F 16/26* | (2019.01) |
| *G06F 16/9535* | (2019.01) |

(52) U.S. Cl.
CPC .......... *G06F 16/285* (2019.01); *G06F 16/26* (2019.01); *G06F 16/9535* (2019.01); *G06Q 50/18* (2013.01)

(58) Field of Classification Search
CPC .... G06F 16/285; G06F 16/26; G06F 16/9535; G06Q 50/18
USPC ........................................................ 707/740
See application file for complete search history.

(56) References Cited

U.S. PATENT DOCUMENTS

| | | | |
|---|---|---|---|
| 5,557,780 A | 9/1996 | Edwards et al. | |
| 5,675,785 A | 10/1997 | Hall et al. | |
| 6,199,079 B1 | 3/2001 | Gupta | |
| 6,550,057 B1 * | 4/2003 | Bowman-Amuah | ... H04L 67/42 717/126 |
| 6,633,875 B2 | 10/2003 | Brady | |
| 7,546,312 B1 | 6/2009 | Xu et al. | |

(Continued)

OTHER PUBLICATIONS

"What is PACER?" Aug. 4, 2008, http://www.pacer.gov/pacerdesc.html (3 pages total).

(Continued)

*Primary Examiner* — Robert Stevens
(74) *Attorney, Agent, or Firm* — Mark K. Young; Mayer & Williams PC

(57) ABSTRACT

Data gathering and re-presentation tools provided by a service to a client organization enable data to be acquired in an automated manner from a multiplicity of systems (e.g., proprietary databases and other data storage, handling, and management systems) and then re-present the acquired data in any layout and in format in accordance with specifications provided by the client and/or third party. The tools execute routines to validate the acquired data to ensure its completeness and logical accuracy as well as enrich the data with data from other sources or data that is derived from the acquired data. The processed data is organized and transformed into specified end states and routed to appropriate recipients in the client organization.

14 Claims, 14 Drawing Sheets

(56) References Cited

U.S. PATENT DOCUMENTS

| | | |
|---|---|---|
| 7,702,575 B1 | 4/2010 | Lofton et al. |
| 7,711,738 B1 | 5/2010 | Kraft |
| 7,761,372 B2 | 7/2010 | McDonald |
| 7,945,583 B2 | 5/2011 | Moyaux et al. |
| 7,962,512 B1 * | 6/2011 | Sholtis ............ G06F 16/256 |
| | | 707/777 |
| 8,019,664 B1 | 9/2011 | Tifford |
| 8,484,511 B2 | 7/2013 | Tidwell et al. |
| 8,606,666 B1 | 12/2013 | Courbage et al. |
| 8,756,132 B2 | 6/2014 | Petr et al. |
| 8,874,476 B1 | 10/2014 | Taylor et al. |
| 9,361,656 B2 | 6/2016 | Taylor, III |
| 2001/0029482 A1 | 10/2001 | Tealdi |
| 2001/0049678 A1 | 12/2001 | Yaginuma |
| 2003/0061132 A1 | 3/2003 | Yu, Sr. |
| 2004/0128170 A1 | 7/2004 | MacKethan |
| 2004/0215656 A1 | 10/2004 | Dill et al. |
| 2004/0236805 A1 | 11/2004 | Gordon |
| 2005/0102226 A1 | 5/2005 | Oppenheimer et al. |
| 2005/0288955 A1 | 12/2005 | Lewiss-Hachmeister |
| 2006/0059073 A1 | 3/2006 | Walzak |
| 2006/0206490 A1 | 9/2006 | Schiller |
| 2006/0271450 A1 | 11/2006 | Cohen et al. |
| 2006/0282359 A1 | 12/2006 | Nobili et al. |
| 2007/0011183 A1 | 1/2007 | Langseth et al. |
| 2007/0185797 A1 | 8/2007 | Robinson |
| 2008/0059364 A1 | 3/2008 | Tidwell et al. |
| 2009/0043743 A1 | 2/2009 | Kraft |
| 2010/0191660 A1 | 7/2010 | Burr et al. |
| 2010/0211484 A1 | 8/2010 | Malcolm et al. |
| 2010/0241558 A1 | 9/2010 | Chmielewski et al. |
| 2010/0332453 A1 | 12/2010 | Prahlad et al. |
| 2011/0016042 A1 | 1/2011 | Cho et al. |
| 2011/0106694 A1 | 5/2011 | Petr et al. |
| 2011/0191227 A1 | 8/2011 | Barrett et al. |
| 2011/0238566 A1 | 9/2011 | Santos |
| 2011/0251945 A1 | 10/2011 | Liao et al. |
| 2011/0270763 A1 * | 11/2011 | Graham, III ....... G06Q 20/3829 |
| | | 705/71 |
| 2011/0320399 A1 | 12/2011 | Ledwich et al. |
| 2012/0246124 A1 | 9/2012 | Arasaratnam |
| 2013/0198093 A1 | 8/2013 | Taylor, III |
| 2016/0163006 A9 | 6/2016 | Taylor, III |

OTHER PUBLICATIONS

"About the NDC" Sep. 17, 2010, Copyright 2009 https://13datacenter.com/about/index.asp (1 page total).

Stanford, Monte, "Mortgage Banking: Internet and Integration are Key", IT Professional, vol. 4, Issue 2, Mar./Apr. 2002, pp. 47-52.

Stranieri, Andrew, et al., "Chap 4: Knowledge Discovery from Legal Databases—Using Neural Networks and Data Mining to Build Legal Decision Support Systems", Information and Technology Lawyers, Springer, © 2006, pp. 81-117.

Rahm, Erhard, et al., "A survey of approaches to automatic schema matching", The VLDB Journal, vol. 10, Issue 4, Dec. 2001, pp. 334-350.

Shaker, R., et al., "A Rule Driven Bi-Directional Translation System for Remapping Queries and Result Sets Between a Mediated Schema and Heterogeneous Data Sources", AMIA 2002 Annual Symposium Proceedings, San Antonio, TX, Nov. 9-13, 2002, pp. 692-696.

Adomavicius, Gediminas, et al., "Using Data Mining Methods to Build Customer Profiles", Computer, vol. 34, Issue 2, IEEE Computer Society, © 2001, pp. 74-82.

* cited by examiner

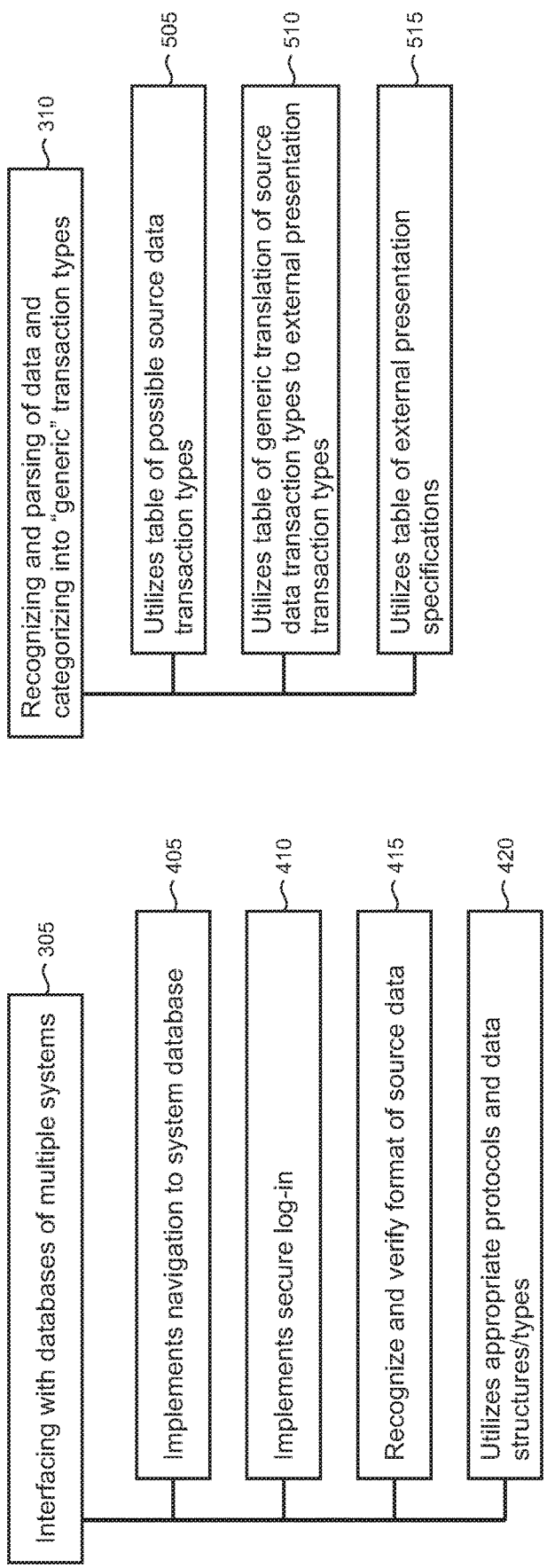

DATA GATHERING AND DATA RE-PRESENTATION TOOLS

CROSS-REFERENCE TO RELATED APPLICATIONS

This application is a continuation of U.S. Ser. No. 13/737,844 filed Jan. 9, 2013 entitled, "Data Gatehring and Data Re-Presentation Tools", now U.S. Pat. No. 10,078,685 issued Sep. 18, 2018 which claims benefit of priority to U.S. Provisional Patent Application Ser. No. 61/584,483 filed Jan. 9, 2012 entitled "Data Gathering and Data Re-Presentation Tool" and U.S. Provisional Patent Application Ser. No. 61/584,497 filed Jan. 9, 2012 entitled "Data Mining and Logic Checking Tool" the disclosures of which are incorporated by reference herein in their entirety with the same effect as if set forth at length.

BACKGROUND

The need for creditors to present debtors' loan transaction ledgers or histories in a presentable, understandable, transferrable format is a common challenge. Unfortunately, such data, as presented by most conventional systems such as creditor loan accounting systems, is very code-intensive and not articulated for consumption by non-technical recipients.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Data gathering and re-presentation tools provided by a service to a client organization enable data to be acquired in an automated manner from a multiplicity of systems (e.g., proprietary databases and other data storage, handling, and management systems) and then re-present the acquired data in any layout and in format in accordance with specifications provided by the client and/or a third party. The tools execute routines to validate the acquired data to ensure its completeness and logical accuracy as well as enrich the data with data from other sources or data that is derived from the acquired data. The processed data is organized and transformed into specified end states and routed to appropriate recipients in the client organization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 4 shows a taxonomy of illustrative functionalities exposed by a tool for interfacing with databases of multiple systems;

FIG. 5 shows a taxonomy of illustrative functionalities exposed by a tool for recognizing and parsing of data and categorizing into "generic" transaction types;

Like reference numerals indicate like elements in the drawings. Elements are not drawn to scale unless otherwise indicated.

DETAILED DESCRIPTION

Figure 1:
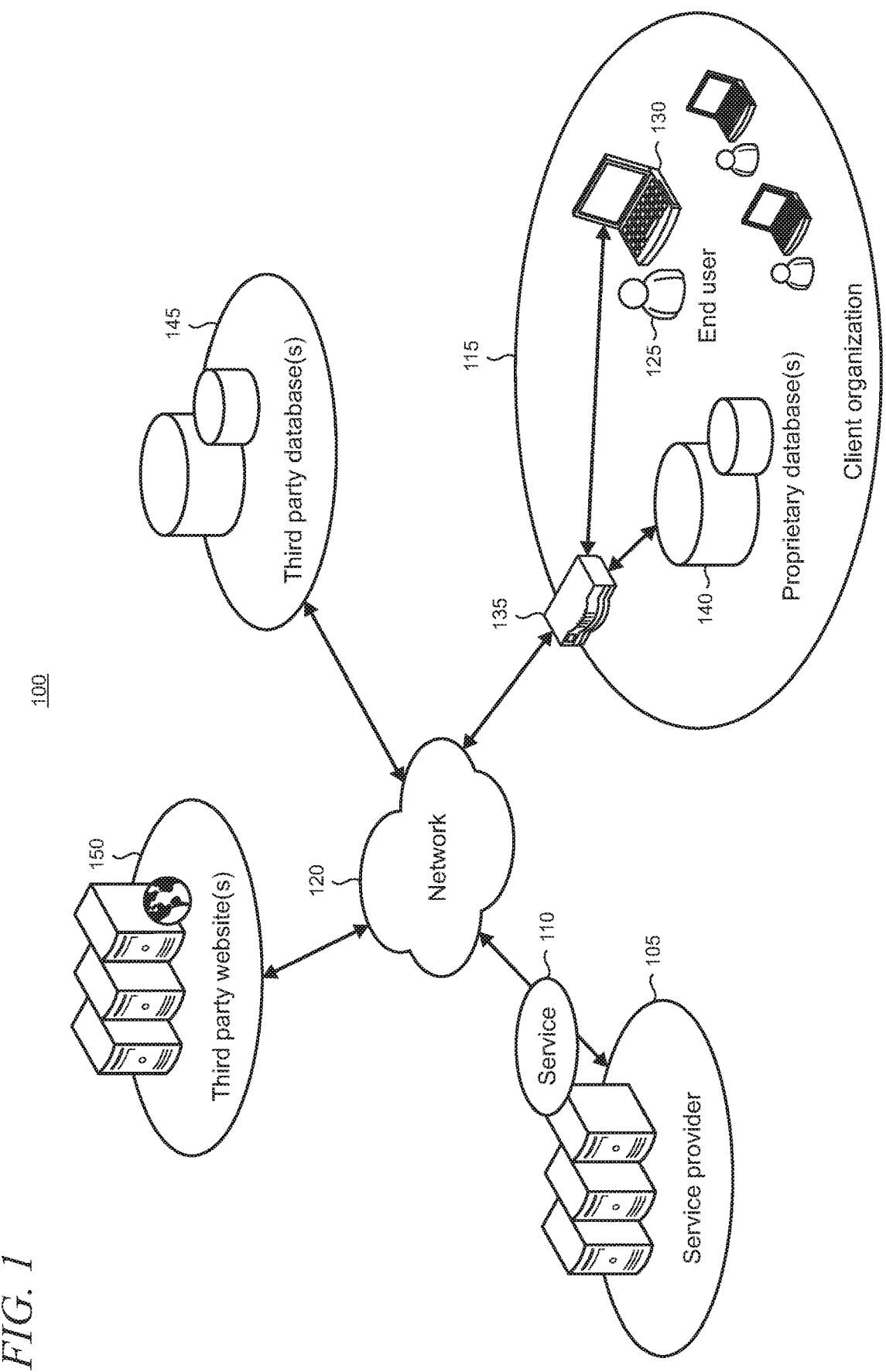
FIG. 1 shows an illustrative computing environment in which the present data gathering and re-presentation tools may be utilized.

FIG. 1 shows an illustrative computing environment 100 in which the present data gathering and re-presentation tools may be utilized. A service provider 105 provides a service 110 that incorporates one or more automated data gathering and re-presentation tools to a client organization 115. As described in the illustrative examples below, the client organization 115 is typically a financial institution such as a bank. In many implementations of the tools, the service 110 is facilitated using a secure connection to the client organization 115 such as a virtual private network (VPN), IPSec connection, or the like, over a public network 120 (e.g., the Internet).

The client organization 115 will generally support a number of end users working on various client devices such as laptops, terminals, personal computers (PCs), and the like. A representative end user and a client device are respectively indicated by reference numerals 125 and 130. The client device 130 may couple to the network 120 through a gateway 135 or similar device. One or more proprietary databases 140 are located in the client organization 115 or are otherwise associated with the organization, for example using remote or cloud-based data storage paradigms. The databases 140 typically contain financial data such as loan transaction ledgers or histories.

Third party databases 145 (i.e., databases which are not proprietary to the client organization 115) are also part of the environment 100 and accessible to the service 110 over the network 120. The third party databases 145 may, in some instances, contain data that has relevance to the client organization 115 as described in more detail below. An exemplary third party database is one associated with the National Data Center (NDC). Similarly, the service 110 may also access third party websites 150 over the network 120. In some cases the third party websites may expose data that is relevant to the client organization 115. An exemplary third party website includes PACER (Public Access to Court Electronic Records).

Figure 2:
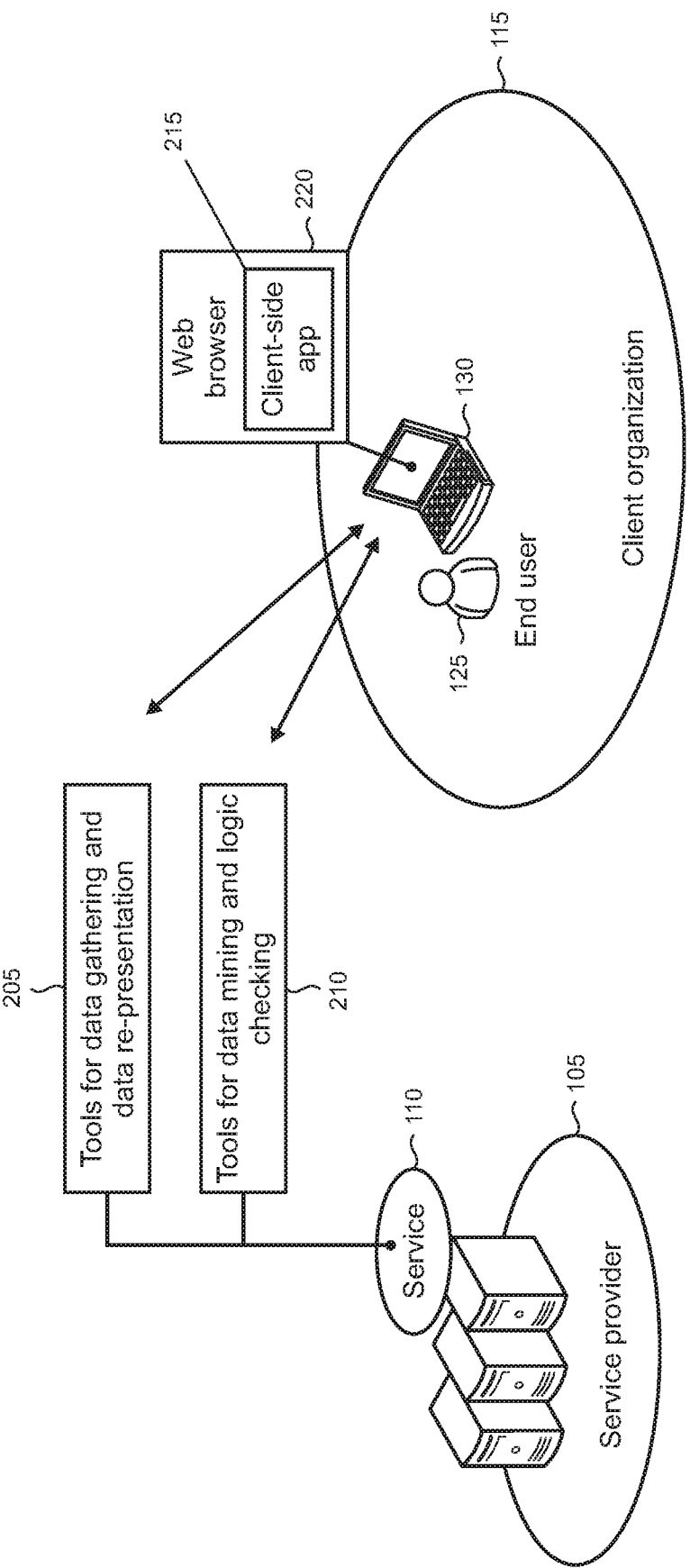
FIG. 2 shows illustrative automated toolsets that may be exposed by a service to a client organization that supports various client devices utilized by end-users.

FIG. 2 shows various illustrative automated toolsets that may be exposed by the service 110 to the client organization 115. In this example, the toolsets include tools for data gathering and data re-presentation 205 and tools for data mining and logic checking 210. The automated tools may typically be invoked by an end-user 125 at a client device 130 typically using a client-side app (application) 215 that may be implemented, for example, with a web browser 220. In addition to invoking automated tool execution, the end-user 125 may provide input, specify conditions and operating parameters to be utilized by the tools, set preferences, and interface with tools in other various ways using the client-side app 215. Administrative actions and functionalities such as control over user access, privileges, and the like may also be exposed by the client-side app 215 to system administrators.

Figure 3:
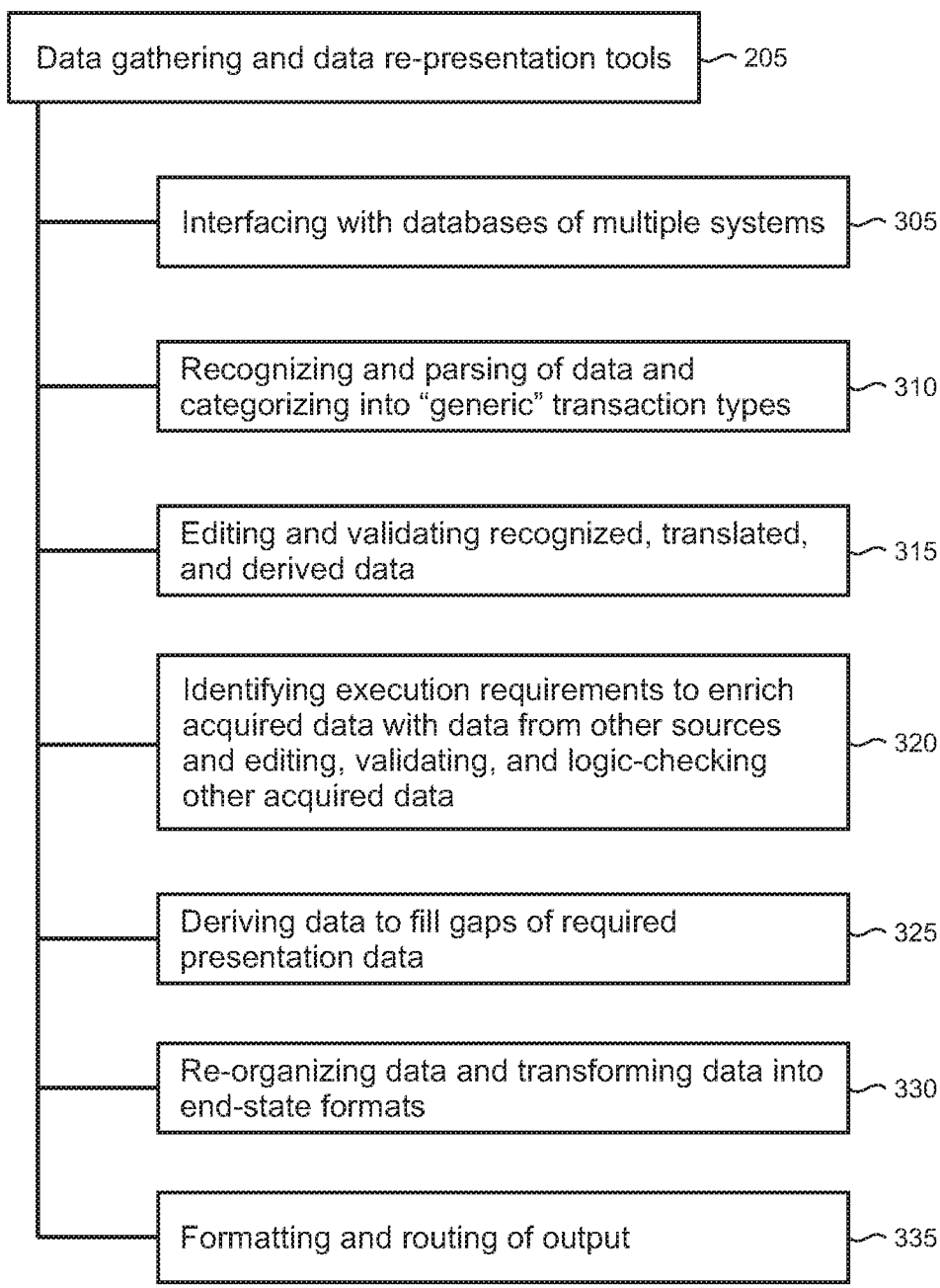
FIG. 3 shows a taxonomy of an illustrative set of automated tools for data gathering and re-presentation.

FIG. 3 shows a taxonomy 300 of an illustrative set of automated tools for data gathering and re-presentation 205. Each of the tools is described in detail below with examples. In typical implementations, the tools are realized through appropriate software code that is stored on computer-readable storage media. The code is then executed by one or more processors disposed in more or more servers utilized by the service provider 105 (FIG. 1) to implement the automated tool functionalities.

In this illustrative example, as shown, the set 205 includes an automated tool for interfacing with databases of multiple systems (as indicated by reference numeral 305). The set 205 further includes an automated tool for recognizing and parsing of data and categorizing into "generic" transaction types (310). The set 205 further includes an automated tool for editing and validating recognized, translated, and derived data (315). The set 205 further includes an automated tool for identifying execution requirements to enrich acquired data with data from other sources and editing, validating, and logic-checking other acquired data (320). The set 205 further includes an automated tool for deriving data to fill gaps of required presentation data (325). The set 205 further includes an automated tool for re-organizing data and transforming data into end-state formats (330). The set 205 further includes an automated tool for formatting and routing of output (335).

FIG. 4 shows a taxonomy of illustrative functionalities exposed by the tool 305 for interfacing with databases of multiple systems. The functionalities implement navigation to a system database (405), implement secure log-in (410), recognize and verify the format of the source data (415) and utilize appropriate protocols and data structures/types (420).

In one particular example using tool 305, data of interest is stored in the client organization's proprietary database such as one associated with a financial service provider, for example, the Mortgage Servicing Package (MSP) offered by Lender Processing Services (LPS). The service 110 (FIG. 1) navigates to the client organization's VPN using specifications provided in a client navigation table entry that is accessible by the service per agreement between the service and the client organization. The service 110 logs into the VPN using specifications provided in a client security table entry. Upon verification of VPN access, the service 110 navigates to the client's MSP web service gateway, again using specifications provided in the client navigation table entry.

Upon verification by the MSP web service gateway, the service 110 logs into the web service active channel using data from the client security table entry. Upon verification of web service active channel access, the service 110 constructs web service calls as needed to retrieve data for a customer view loan history using specifications from one or more client view data source table entries, and the constructed web service calls are transmitted to the client organization. In response to the web service calls, the service 110 receives web service return data which is stored.

In this example, using the returned data from the MSP system, as described above, additional data is acquired from the PACER system (i.e., a third party website 150 in FIG. 1) including a case number and applicable Federal District Court. The service 110 navigates to the appropriate PACER web pages using specifications from the client's navigation table entry. The service 110 logs onto PACER using the client security table entry. The service 110 captures one or more pages and, after validating a correct destination from the client's navigation table entry, downloads the captured data to storage.

FIG. 5 shows a taxonomy of illustrative functionalities exposed by the tool 310 for recognizing and parsing of data and categorizing into "generic" transaction types. The functionalities utilize a table of possible source data transaction types (505), utilize a table of generic translation of source data transaction types to external presentation transaction types (510), and utilize a table of external presentation specifications (515).

Continuing with the example above, using tool 310, the data acquired from the PACER website is parsed. In this example, the pertinent data from PACER is a bankruptcy filing date (referred to here as the PACER BK FILED DATE). Here, the tool 310 employs the table of possible source data transaction types 505 to verify that certain data is present in the HTML (HyperText Markup Language) code from the PACER pages. More specifically, the verification comprises "U.S. Bankruptcy Court" being in the first line, "District of _____" being in the second line, and "Bankruptcy Petition #:_____" being in the third line (where the blank spaces are filled in with data acquired from the client MSP system). If the data in those three lines is verified, then the tool 310 locates the "Date filed:" string on the fourth line of the HTML code and captures the text following the string, for example "05/18/2012" as the PACER BK FILED DATE. The table of generic translation of source data transaction types to external presentation transaction types 510 is utilized, in this example, to tag the PACER BK FILED DATE as DATE. The table of external presentation specifications 515 is utilized, in this example, to tag the PACER BK FILED DATE as OUT=YYYYMMDD (i.e., year, month, day).

Figure 6:
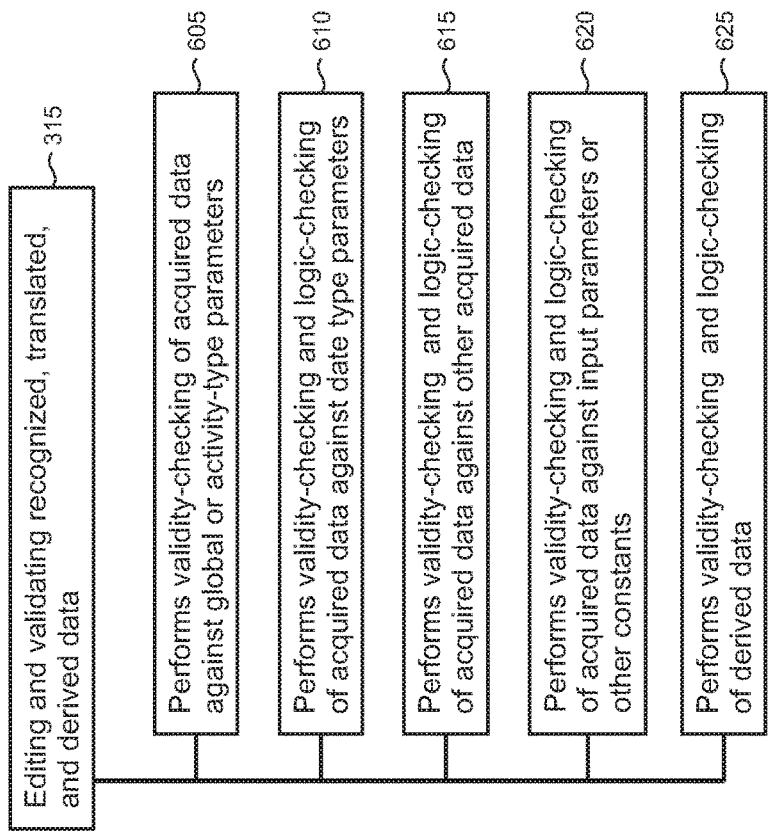
FIG. 6 shows a taxonomy of illustrative functionalities exposed by a tool for editing and validating recognized, translated, and derived data.

FIG. 6 shows a taxonomy of illustrative functionalities exposed by the tool 315 for editing and validating recognized, translated, and derived data. The functionalities perform validity-checking of acquired data against global or activity-type parameters (605), perform validity-checking and logic-checking of acquired data against data type parameters (610), perform validity-checking and logic-checking of acquired data against other acquired data (615), perform validity-checking and logic-checking of acquired data against input parameters or other constants (620), and perform validity-checking and logic-checking of derived data (625).

Continuing with the example above, the functionality 605 exposed by tool 315 validates that the acquired PACER BK FILED DATE (which is specified in a client data format table as MM/DD/YYYY) consists of NN/NN/NNNN (i.e., 10 positions, all numeric and special characters) and converts the acquired data into date format. The functionality 610 validates that the acquired BK FILED DATE meets each of the following:
  a. 13>MM>00
  b. IF MM=01 or 03 or 05 or 07 or 08 or 10 or 12; 32>DD>00
  c. IF MM=04 or 06 or 09 or 11; 31>DD>00
  d. IF MM=02 AND IF YY=2012 or 2008 or 2004 or 2000 or 1996 or 1992 or 1988 or 1984 or 1980; 30>DD>00
  e. IF MM=02 AND IF YY≠2012 or 2008 or 2004 or 2000 or 1996 or 1992 or 1988 or 1984 or 1980; 29>DD>00
  f. is before data acquisition processing date The functionality 615 validates that the acquired BK FILED DATE meets each of the following:
  a. is after Loan Date from the client MSP system
  b. is before PACER Plan Confirmed Date from PACER if present
  c. is before PACER Case Terminated Date from PACER if present
  d. is before PACER Case Closed Date from PACER if present
  e. is before PACER Case Dismissed Date from PACER if present The functionality 620 validates the acquired date against all client view data specifications (from a client view data source(s) table entry). Here, the PACER BK FILED DATE must be less than or equal to 4 years prior to the data acquisition processing date. If not, then a flag is set to "LATE-IN-PLAN." If any of validations performed by functionalities 605, 610, and 615 fails, then the PACER BK FILED DATE is tagged as Failed Validation. If each of the validations is passed, then the value of the PACER BK FILED DATE is written to the BK Filed Date Field.

Figure 7:
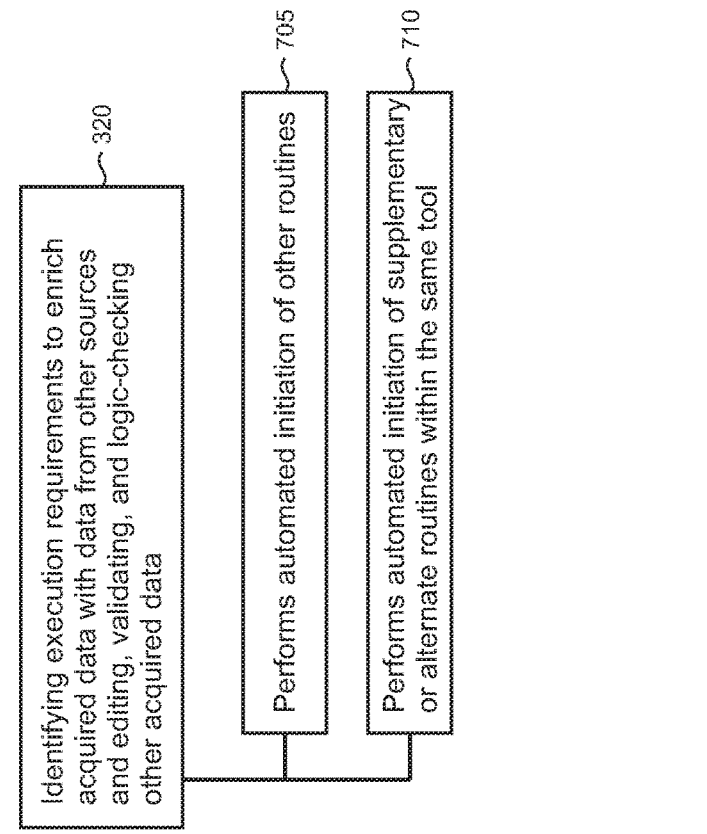
FIG. 7 shows a taxonomy of illustrative functionalities exposed by a tool for identifying execution requirements to enrich acquired data with data from other sources and editing, validating, and logic-checking other acquired data.

FIG. 7 shows a taxonomy of illustrative functionalities exposed by the tool 320 for identifying execution requirements to enrich acquired data with data from other sources and editing, validating, and logic-checking other acquired data. The functionalities perform automated initiation of other routines (705) (i.e., those provided by other toolsets) and perform automated initiation of supplementary or alternate routines within the same tool (710). It is noted that such routines can be configured to be conditional and self-detected depending on the data parameters, and then self-initiated.

In an illustrative example, in the case of the PACER acquired data showing a Debtor Discharged Date or Co-Debtor Discharged date being present, Docket Report log entries are searched for "discharged" text. Log entries which include such text are searched to determine if acquired data from the MSP includes a Secured Creditor in the log text. If any log entries are found with a matching MSP acquired Secured Creditor, then a flag is set to "Discharged." If no log entries are found with MSP acquired Secured Creditor, then a flag is set to "Possibly Discharged Entry Requires Review." If no log entries are found with matching text "discharged," a flag is set to "PACER Discharged Status No Discharge Docket Events."

Figure 8:
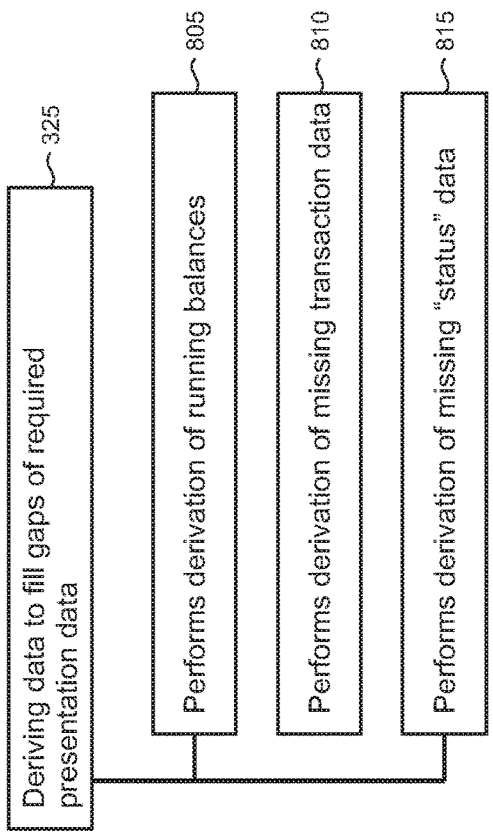
FIG. 8 shows a taxonomy of illustrative functionalities exposed by a tool for deriving data to fill gaps of required presentation data.

FIG. 8 shows a taxonomy of illustrative functionalities exposed by the tool 325 for deriving data to fill gaps of required presentation data. The functionalities perform derivation of running balances (805), perform derivation of missing transaction data (810), and perform derivation of missing "status" data (815). For example when deriving running balances, in the case of a Loan Suspense Balance not being provided, a Running Suspense Balance End-to-Beginning routine is executed as follows:
  1. For the latest transaction including an amount applied to (or debited from) suspense, write MSP acquired Suspense Balance as the Ending Suspense Balance for the transaction.
  2. For each prior transaction including an amount applied to (or debited from) suspense, use the next following transaction and, Subtract the amount of any deposit to suspense or add the amount of any debit to suspense in that transaction to the Ending Suspense Balance for that transaction and write the sum to Ending Suspense Balance for the immediately preceding transaction and tag Ending Suspense Balance element written as Derived by Running Suspense Balance End-to-Beginning routine.
  3. Reiterate the above steps until all transactions have been processed.
  4. When all transactions including suspense deposits or debits have been processed, write the Ending Suspense Balance from the earliest transaction to Derived Period Reported Beginning Suspense Balance.
  5. Validate the MSP acquired Period Reported Beginning Suspense Balance equals Derived Period Reported Beginning Suspense Balance.
    If the validation fails, execute Running Suspense Balance Beginning-to-End routine (no iteration, but this routine is the same as the Running Suspense Balance End-to-Beginning routine, but starting from the Period Reported Beginning Suspense Balance and proceeding to calculate the ending balance after each transaction from earliest to last, and the associated write tags will be Derived by Running Suspense Balance Beginning-to-End routine). Validate Derived Period Ending Suspense Balance equals MSP acquired Period Reported Beginning Suspense Balance. If the validation fails, a flag is set to "Suspense Not Validated By Transactions."

For deriving missing transaction data, an example includes a transaction Total Amount=2,000.00; Principal Applied=150.00; Interest Applied=1,200.00; Escrow Applied=100.00; Restricted Escrow Applied=50.00; Suspense Applied=0.00. Using the routine described above, this transaction would be tagged as Transaction Out-of-Balance.

Such tag invokes an initiation of a Review Running Balances Routine where iteration is performed as necessary. This routine audits each running balance at each transaction point to determine if each transaction and each running balance cross-foot. The routine iterates through and tallies discrepancies and makes them running "finds" and computes the possibility of allocating the "finds" against the out-of-balance conditions to work-down the out-of-balance amounts and allocate them to the non-cross-footing transactions. All allocations are tagged as Derived by Review Running Balance Routine.

For deriving missing "status" data, an example includes the PACER BK FILED DATE having been tagged as Failed Validation through application of the tool 315, as described above. If the MSP BK FILED passes the validation routines, then a Derive BK Filed Date From MSP BK Filed Date routine is executed where the MSP BK FILED DATE value is written to the BK Filed Date field.

Figure 9:
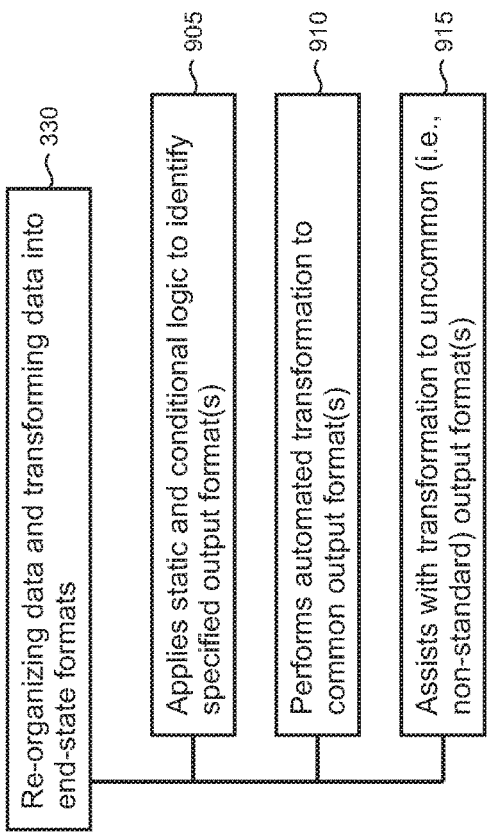
FIG. 9 shows a taxonomy of illustrative functionalities exposed by a tool for re-organizing data and transforming data into end-state formats.

FIG. 9 shows a taxonomy of illustrative functionalities exposed by the tool 330 for re-organizing data and transforming data into end-state formats. The functionalities apply static and conditional logic to identify specified output format(s) (905), perform automated transformation to common output format(s) (910), and assist with transformation to uncommon (i.e., non-standard) output format(s) (915). Common output formats include:
  i. .pdf (Adobe Systems Portable Document Format)
  ii. Microsoft Office Word formats—.doc, .docm, .docx, .dot, .dotx, .dotm
  iii. Microsoft Access formats—.adp, .adn, .accdb, .accdt, .mdb, .mda, .mdt, .mdw, .mde, .accde, .mam, .maq, .maq, .mar, .mat, .maf
  iv. Microsoft Office Excel formats—.xls, .xlsx, .xlt, .xltx, .xltm, .csv, .xla, .xlam, .xlb, .xlsb, .xlc, .xld, .xlk, .xll, .xlm, .xlsm
  v. .xml—Extensible Markup Language
  vi. .rtf—Rich Text Format
  vii. .txt—plain text Non-standard outputs include client-specified and/or proprietary format specifications. Various adjustments of the editing, validity-checking and logic-checking routines instantiated by the tools as described above may be performed to ensure compliance with the client specifications.

Figure 10:
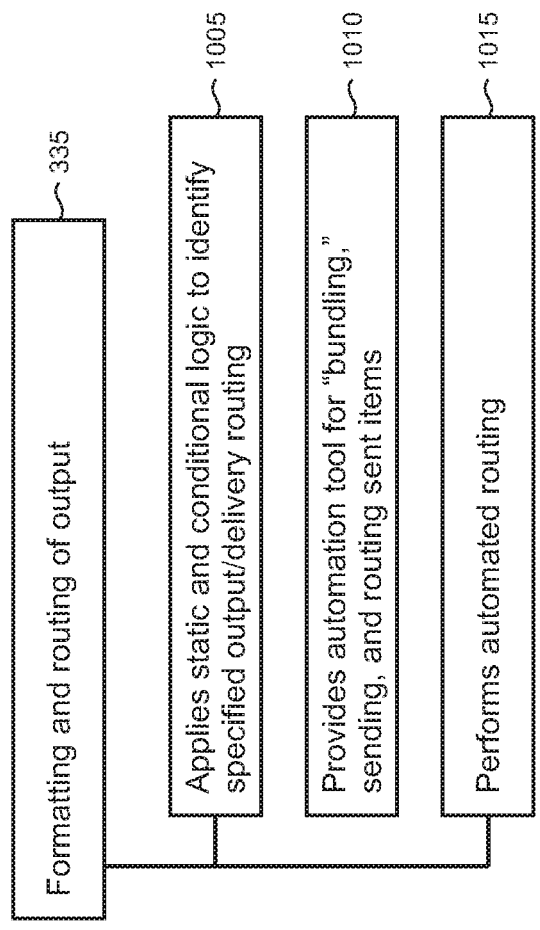
FIG. 10 shows a taxonomy of illustrative functionalities exposed by a tool for formatting and routing of output.

FIG. 10 shows a taxonomy of illustrative functionalities exposed by the tool 335 for formatting and routing of output. The functionalities apply static and conditional logic to identify specified output/delivery routing (1005), provide automation tool for "bundling," sending, and routing sent items (1010), and perform automated routing (1015). Various conventional protocols and methodologies may be employed including WSE (Web Services Enhancements) or WCF (Windows Communication Foundation), REST (Representational State Transfer) to enable web data file site-to-site transfer over the internet and posting to recipient database, FTP (File Transfer Protocol) or SFTP (Secure File Transfer Protocol) to enable site-to-site internet data file transfer, client-proprietary VPN to enable secured-communications-tunnel data file transfer, and Email.

Figure 11:
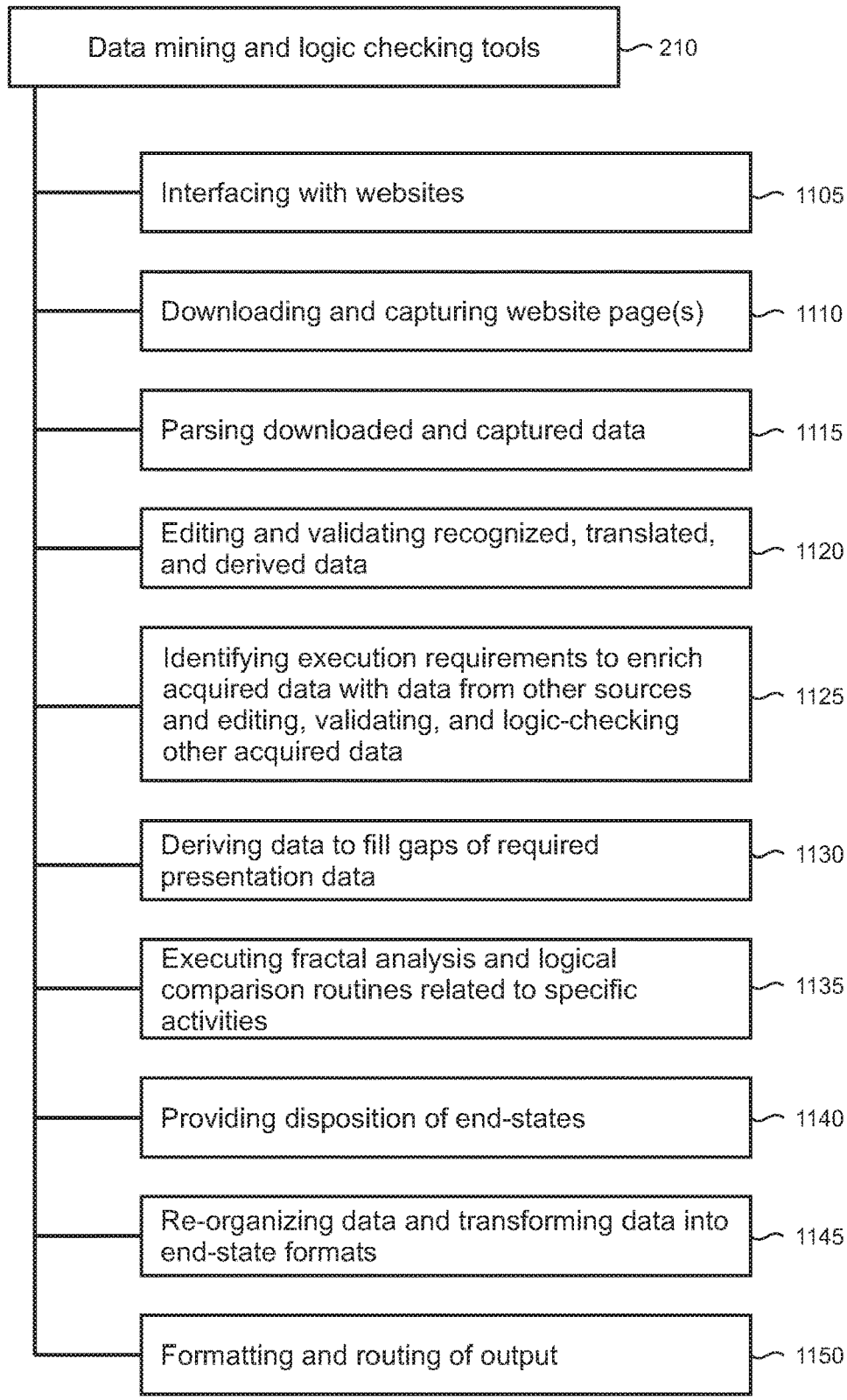
FIG. 11 shows a taxonomy of an illustrative set of automated tools for data mining and logic checking.

FIG. 11 shows a taxonomy 1100 of an illustrative set of automated tools for data mining and logic checking 210. Each of the tools is described in detail below with examples. In typical implementations, the tools are realized through appropriate software code that is stored on computer-readable storage media. The code is then executed by one or more processors disposed in one or more servers utilized by the service provider 105 (FIG. 1) to implement the automated tool functionalities.

In this illustrative example, as shown, the set 210 includes an automated tool for interfacing with websites (as indicated by reference numeral 1105). The set 210 further includes an automated tool for downloading and capturing website page(s) (1110). The set 210 further includes an automated tool for parsing downloaded and captured data (1115). The set 210 further includes an automated tool for editing and validating recognized, translated, and derived data (1120). The set 210 further includes an automated tool for identifying execution requirements to enrich acquired data with data from other sources and editing, validating, and logic-checking other required data (1125). The set 210 further includes an automated tool for deriving data to fill gaps of required presentation data (1130). The set 210 further includes an automated tool for executing fractal analysis and logical comparison routines related to specific activities (1135). The set 210 further includes an automated tool for determining disposition of end states (1140). The set 210 further includes an automated tool for re-organizing data and transforming data into end-state formats (1145). The set 210 further includes an automated tool for formatting and routing of output (1150)

Figure 12:
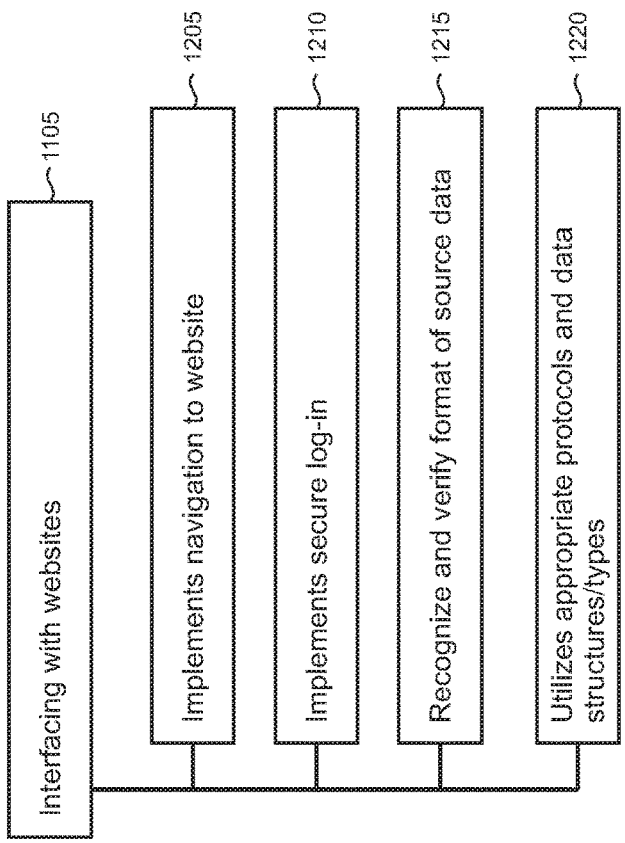
FIG. 12 shows a taxonomy of illustrative functionalities exposed by a tool for interfacing with websites.

FIG. 12 shows a taxonomy of illustrative functionalities exposed by a tool 1105 for interfacing with websites, such as the third party websites 150 (FIG. 1). The functionalities implement navigation to websites (1205), implement secure log-in (1210), recognize and verify the format of the source data (1215) and utilize appropriate protocols and data structures/types (1220).

In one particular example using tool 1105, case data associated with a bankruptcy proceeding is acquired from PACER. The service 110 (FIG. 1) navigates to PACER and to the appropriate PACER page(s) using specifications provided in a client navigation table entry. The service 110 verifies that the expected page is reached using specifications from the client navigation table entry. If an expected page is not reached, the service 110 terminates navigation and re-initiates, as appropriate. If an expected page is reached, the service 110 proceeds with log-in to PACER using the client security table entry. The service verifies that the expected page is reached using specifications from the client navigation table entry. If an expected page is not reached, the service 110 terminates navigation and re-initiates, as appropriate.

If an expected page is reached, the service 110 proceeds with presentation type recognition. Here, the service 110 verifies an expected page data presentation type using specifications from a data source attributes table entry. If the data presentation type is not validated, then a Recognize Presentation Format routine is initiated as follows:
  The routine chooses blocks of data and compares to known formats (HTML, HTML table, PHP (HyperText Preprocessor), etc.,
    IF the format is recognized and within processable parameters, an Adjust Recognition routine is initiated and processing proceeds,
    IF format is not recognized and within processable parameters, processing is suspended and a Production Interrupted Analysis Queue routine is initiated for review and resolution.

If the data presentation type is validated, the service 110 proceeds to match the presentation type to a capture/download protocol using specifications from a data source presentation type capture protocol table entry, and initiates capture/download accordingly.

Figure 13:
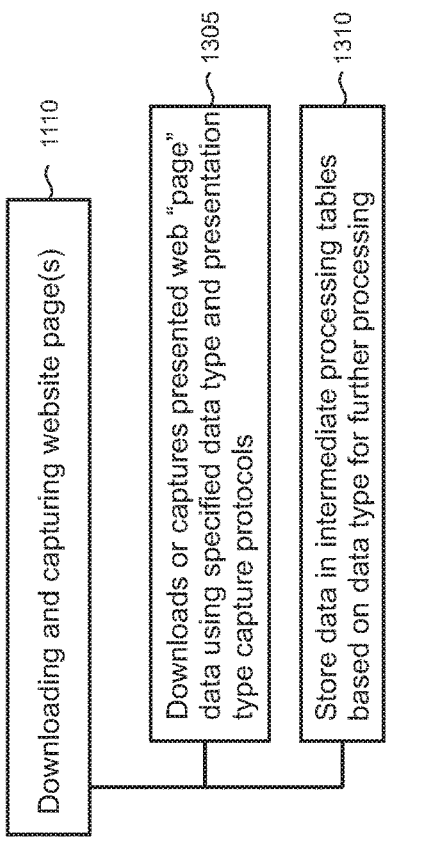
FIG. 13 shows a taxonomy of an illustrative functionalities exposed by a tool for downloading and capturing website page(s)
Figure 14:
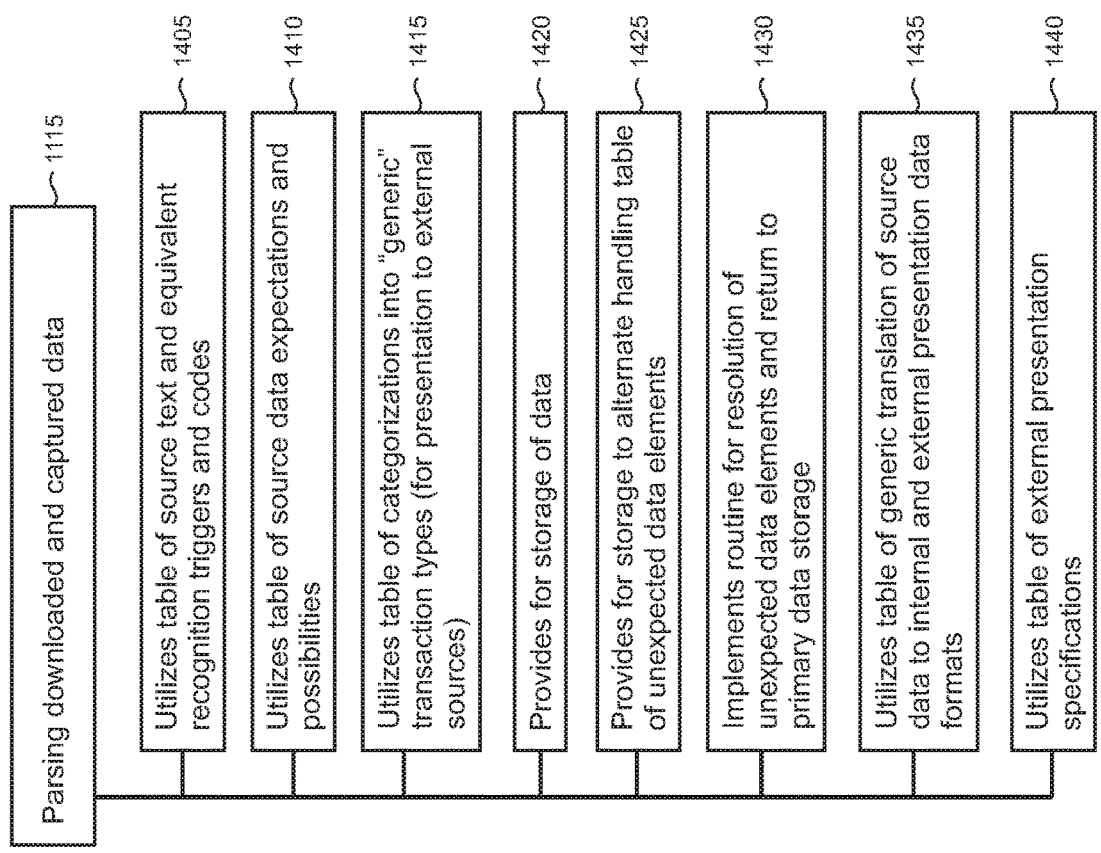
FIG. 14 shows a taxonomy of illustrative functionalities exposed by a tool for parsing downloaded and captured data.

FIG. 13 shows a taxonomy of illustrative functionalities exposed by the tool 1110 for downloading and capturing website page(s). The functionalities downloads or captures presented web "page" data using specified data type and presentation type capture protocols (1305) and store data in intermediate processing tables based on data type (1310), using specifications from a data source presentation type capture protocol table entry for further processing. Such captured and stored data may illustratively include:

i. Metadata—including semantic meta-information, Charset information, Document Type Definition (DTD) and other metadata
  ii. Rendered item data—style information like Cascading Style Sheets (CSS), diagramation (image size attributes, visual specifications)
  iii. Scripts
  iv. HTML tables, HTML, DHTML (dynamic HTML), MHTML (Multipurpose Internet Mail Extension HTLM) or XHTML (Extensible HTML)
  v. Interactive data
  vi. Images—.png, .jpg, .tif, .gif, and others
  vii. Linked files
  viii. Comments FIG. 14 shows a taxonomy of illustrative functionalities exposed by the tool 1115 for parsing downloaded and captured data. The functionalities utilize a table of source text and equivalent recognition triggers and codes (1405), utilize a table of source data expectations and possibilities (1410), utilize a table of categorizations into "generic" transaction types (for presentation to external sources) (1415), provide for storage of data (1420), provide for storage to alternate handling table of unexpected data elements (1425), implement a routine for resolution of unexpected data elements and return to primary data storage (1430), utilize a table of generic translation of source data to internal and external presentation data formats (1435), and utilize a table of external presentation specifications (1440).

In an example using tool 1115, the table of source text and equivalent recognition triggers and codes specifies Begin-delimiters and End-delimiters. Here, HTML data from PACER is verified by a routine as including "U.S. Bankruptcy Court" being in the first line, "District of ____" being in the second line, and "Bankruptcy Petition #:____" being in the third line (where the blank spaces are filled in with data acquired from the client MSP system. If the data is not verified, then the routine is aborted and a flag is set on the dataset as "UNVERIFIED DATA CAPTURE" and tool 1105 is reinitiated to navigate to PACER anew.

If the data is verified, a search is performed for "Date filed:" on the fourth line of the HTML using a data dictionary coordinates table entry. If the target text is not found, the entire page is searched for target data. If the target data is still not found, a flag is set on the dataset as "UNVERIFIED DATA CAPTURE—REQUIRED DATA NOT PRESENT" and the tool 1105 is reinitiated to navigate to PACER anew.

If the target data is found, the tool searches for text following the found target text in the format NN/NN/NNNN (i.e., 10 positions, all numeric and special characters) using a data dictionary attributes table entry. If the target data is not found, a flag is set on the dataset as "UNVERIFIED DATA CAPTURE—REQUIRED DATA NOT PRESENT" and the tool 1105 is reinitiated to navigate to PACER anew. If the target data is found but it does not match expected attributes, then the data is stored as PACER BK FILED DATE and a flag is set as "INVALID FORMAT AND POSITION." If the target data is found and matches expected attributes, the data is stored as the PACER BK FILED DATE.

If the target text is found, the tools searches for text following the found target text in the format NN/NN/NNNN. If the follow-on text is not found a flag is set on the dataset as "UNVERIFIED DATA CAPTURE—REQUIRED DATA NOT PRESENT" and the tool 1105 is reinitiated to navigate to PACER anew. If the follow-on text is found but does not match expected attributes, the data is stored as the PACER BK FILED DATE and a flag is set as "INVALID FORMAT." If the follow-on text is found and matches expected attributes, the data is stored as the PACER BK FILED DATE.

In another example, the PACER BK FILED DATE is specified to have attributes MM/DD/YYYY and the functionality 1410 applies verification criteria for component values present as follows:

IF 13>MM>00 ANDIF
  IF MM=01 or 03 or 05 or 07 or 08 or 10 or 12; 32>DD>00 ORIF
  IF MM=04 or 06 or 09 or 11; 31>DD>00 ORIF
  IF MM=02 ANDIF YY=2012 or 2008 or 2004 or 2000 or 1996 or 1992 or 1988 or 1984 or 1980; 30>DD>00 ORIF
  IF MM=02 ANDIF YY≠2012 or 2008 or 2004 or 2000 or 1996 or 1992 or 1988 or 1984 or 1980; 29>DD>00 ANDIF
  Set a Data element verification tag as "LOGICAL"
  IF the data element fails verification, set the Data element verification tag as "ILLOGICAL"

In an example using the table of categorizations into "generic" transaction types for presentation to external sources 1415, if a data element is verified, the service 110 reformats a stored data element value to a specified format using a data dictionary attributes table entry. In this example, the PACER BK FILED DATE element format attribute is DATE—MM/DD/YYYY. Thus the value in the PACER BK FILED DATE field is reformatted from text '05/18/2012' to the Julian date '2456430.500000'

In an example using the functionality 1420 for storage of data, stored data element flags are reviewed:

IF dataset verification level sufficiency ratio overall ORIF critical data elements verified does not meet criteria using Routine Definition Attributes table entry, set a dataset flag as "VERIFICATION FAILED"
IF dataset verification level sufficiency ratio overall ANDIF critical data elements verified does meets criteria using Routine Definition Attributes table entry, set a dataset flag as "VERIFIED"

In an example using the functionality 1425 for storage to alternate handling table of unexpected data elements:

IF dataset flag = 'VERIFICATION FAILED", copy data elements with data element validation tag set as "ILLOGICAL" to an Alternate Handling table In an example using the functionality 1430 for resolving unexpected data elements:

IF entries exist in Alternate Handling table, initiate Data Element Failed Verification routine for attempted resolution
IF entries cleared, set Data Element Validation Flag as "LOGICAL", write data element to Primary Processing Dataset table and re-execute the functionality 1420.

In an example using the table of external presentation specifications 1440, if a dataset flag is set as "VERIFIED", then alternate element attribute variable flags are applied, using external presentation specifications flags from data dictionary attributes table entry, to data elements in a dataset.

Figure 15:
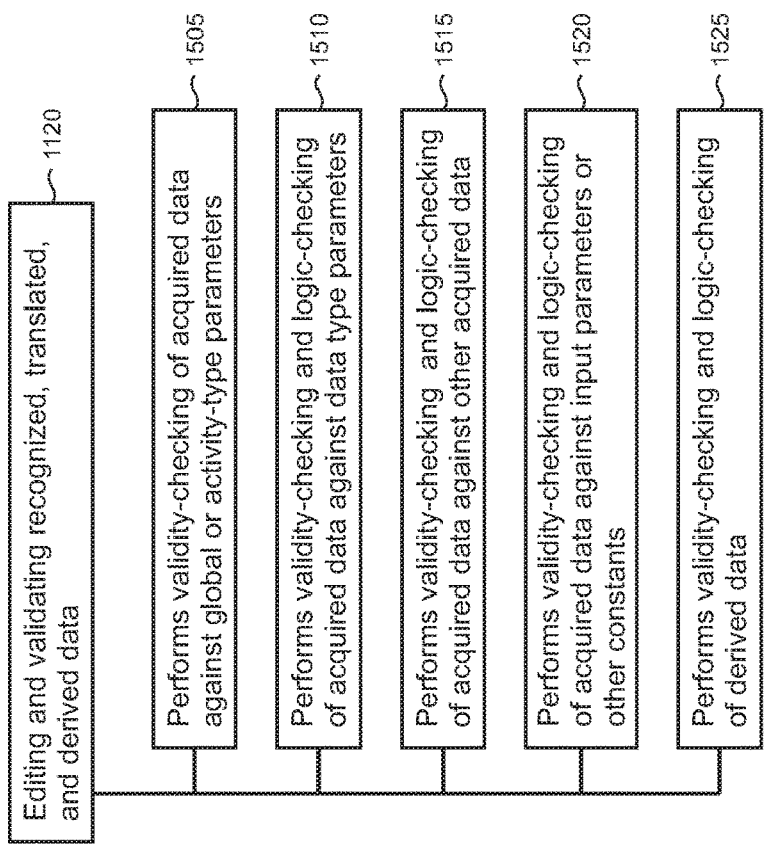
FIG. 15 shows a taxonomy of illustrative functionalities exposed by a tool for editing and validating recognized, translated, and derived data.

FIG. 15 shows a taxonomy of illustrative functionalities exposed by the tool 1120 for editing and validating recognized, translated, and derived data. The functionalities perform validity-checking of acquired data against global or activity-type parameters (1505), perform validity-checking and logic-checking of acquired data against data type parameters (1510), perform validity-checking and logic-checking of acquired data against other acquired data (1515), perform validity-checking and logic-checking of acquired data against input parameters or other constants (1520), and perform validity-checking and logic-checking of derived data (1525).

In an example using tool 1120, the functionality 1505 uses specifications from an order data parameters table entry:

```
IF PACER BK Filing Date > CURRENTDATE
ORIF
CURRENTDATE - 10 YEARS > PACER BK FILING DATE
Set data element tag as "OUT OF RANGE"
```

Continuing with the example, the functionality 1510 uses specifications from an order client-level data parameters entry table:

```
IF CURRENTDATE - 5 YEARS > PACER BK Filing Date
Set data element tag as "OUT OF RANGE FOR CLIENT"
```

Continuing with the example, the functionality 1515 uses specifications from both an order client-level data parameters entry table and specifications from an order data parameters entry table:

```
IF PACER Plan Confirmed Date > PACER BK Filing Date if present
ORIF
PACER Case Terminated Date > PACER BK Filing Date if present
ORIF
PACER Case Closed Date > PACER BK Filing Date if present
ORIF
PACER Case Dismissed Date > PACER BK Filing Date if present
Set data element tag as "OUT OF RANGE FOR CROSS DATA
COMPARISON"
```

Continuing with the example, the functionality 1520 uses specifications from an order data parameters table entry:

```
IF PACER BK Filing Date < ORDERSTARTDATE
Set data element tag = "OUT OF RANGE FOR CLIENT ORDER"
```

Continuing with the example, the functionality 1525 applies similar validity-checking as with the functionalities 1505, 1510, 1515, and 1520 with regard to data elements produced using tool 1130, as described in more detail below.

Figure 16:
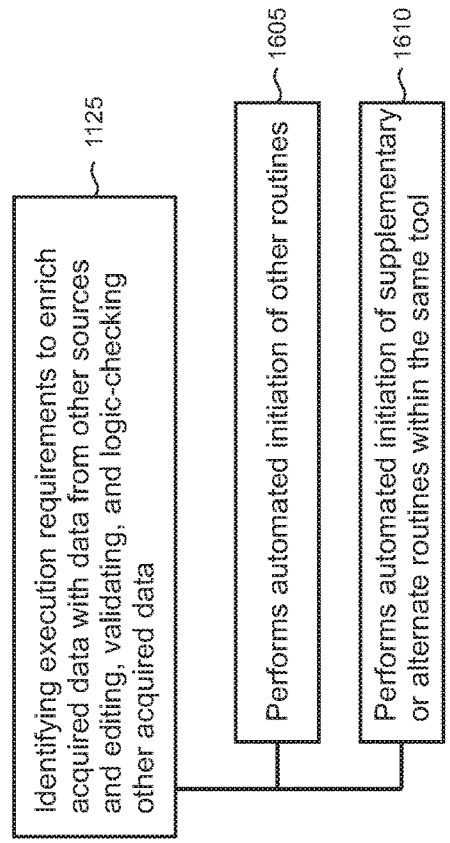
FIG. 16 shows a taxonomy of illustrative functionalities exposed by a tool for identifying execution requirements to enrich acquired data with data from other sources and editing, validating, and logic-checking other acquired data.

FIG. 16 shows a taxonomy of illustrative functionalities exposed by the tool 1125 for identifying execution requirements to enrich acquired data with data from other sources and editing, validating, and logic-checking other acquired data. The functionalities perform automated initiation of other routines (1605) and perform automated initiation of supplementary or alternate routines within the same tool (1610). It is noted that such routines can be configured to be conditional and self-detected depending on the data parameters, and then self-initiated.

In an illustrative example, in the case of an OUT OF RANGE FOR CLIENT ORDER a secondary data source is required for use in data verification, data acquisition, or for additional components for data derivation. Such secondary data source may be provided by a third party database 145 (FIG. 1) using the tools and routines described in the text accompanying FIGS. 3-10.

Figure 17:
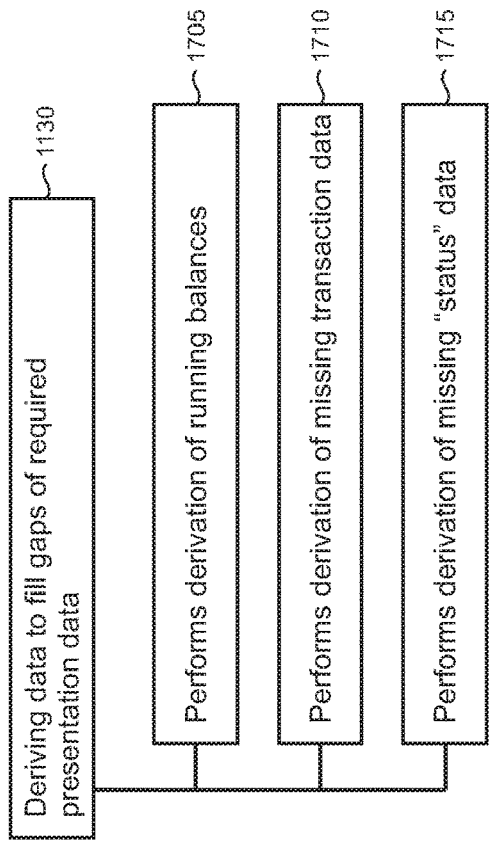
FIG. 17 shows a taxonomy of illustrative functionalities exposed by a tool for deriving data to fill gaps of required presentation data.

FIG. 17 shows a taxonomy of illustrative functionalities exposed by the tool 1130 for deriving data to fill gaps of required presentation data. The functionalities perform derivation of running balances (1705), perform derivation of missing transaction data (1710), and perform derivation of missing "status" data (1715). Tool 1130 operates in a substantially similar manner to tool 325 described in the text accompanying FIGS. 3 and 8.

In an example using the third party database 145 (FIG. 1), the functionality 1705 implements the following routine:

```
NDC transaction data is compared to client transaction data
    IF transactions are not reconciled,
        Tag any client transactions which are not reconciled to
        NDC AND tag any NDC transactions which are not
        reconciled to client data
            IF transaction recognized, but data is different,
            set tag = "NDC TO CLIENT TRANSACTION
            MISMATCH"
            IF NDC transaction present, but no corresponding
            (reconciled or not reconciled) transaction found,
            set tag = "NDC TRANSACTION TO CLIENT DATA
            MISMATCH"
            IF client transaction present, but no
            corresponding (reconciled or not reconciled) NDC
            transaction found, set tag = "CLIENT
            TRANSACTION TO NDC LEDGER MISMATCH"
    IF transactions are reconciled, proceed
```

Continuing with the example, in the case of missing trustee payment transactions, the functionality 1710 implements the following routine:

```
For all unreconciled transactions,
    Compare client data element Claim Balance and NDC Unpaid
    Claim Balance
        IF difference equals the net aggregate of the
        "MISMATCH"-tagged elements,
            Append " RESOLVED BY DERIVATION" to all
            "MISMATCH"-tagged elements' tags
            Enter all transactions to Master Transaction
            dataset
            Execute Recompute Balance routine for each
            running balance entry for each transaction
            beginning with the first "MISMATCH"-tagged
            entry and for all entries after
        IF difference does not equal the net aggregate of the
        "MISMATCH"-tagged elements' tags, execute client-
        specific Reconciliation Resolution routine using
        specifications from an order client-level data parameters
        table entry and using specifications from an order data
        parameters table entry
            (These are tolerance-based routines which go
            transaction by transaction and using date
            reasonability components to determine
            appropriate adjustments to "MISMATCH"-tagged
            transactions and/or to flag for alternate handling
            based on amended tags after Reconciliation
            Resolution.)
```

Continuing with the example, in the case where client data has the data element Claim Priority missing from PACER data, the functionality 1710 implements the following routine:

```
Execute NDC Voucher Download routine for each disbursement
entry for the prescribed claim
Apply NDC Claim Priority search parameter to each NDC Claim
Type element
    IF match inconclusive based on NDC Claim Priority routine
    parameters
        Apply NDC Claim Type search parameter to each
        NDC Claim Type element, each NDC Comment
        element and each NDC Payment Type element
            IF match inconclusive, set tag for PACER
            Claim Priority = "MISSING UNABLE TO BE
            DERIVED FROM ALTERNATE SOURCE"
            IF match conclusive, write derived value
            to PACER Claim Priority field and set tag =
            "DERIVED FROM ALTERNATE SOURCE
            NDC"
    IF match conclusive, write derived value to PACER Claim
    Priority field and set tag = "DERIVED FROM ALTERNATE
    SOURCE NDC"
```

Figure 18:
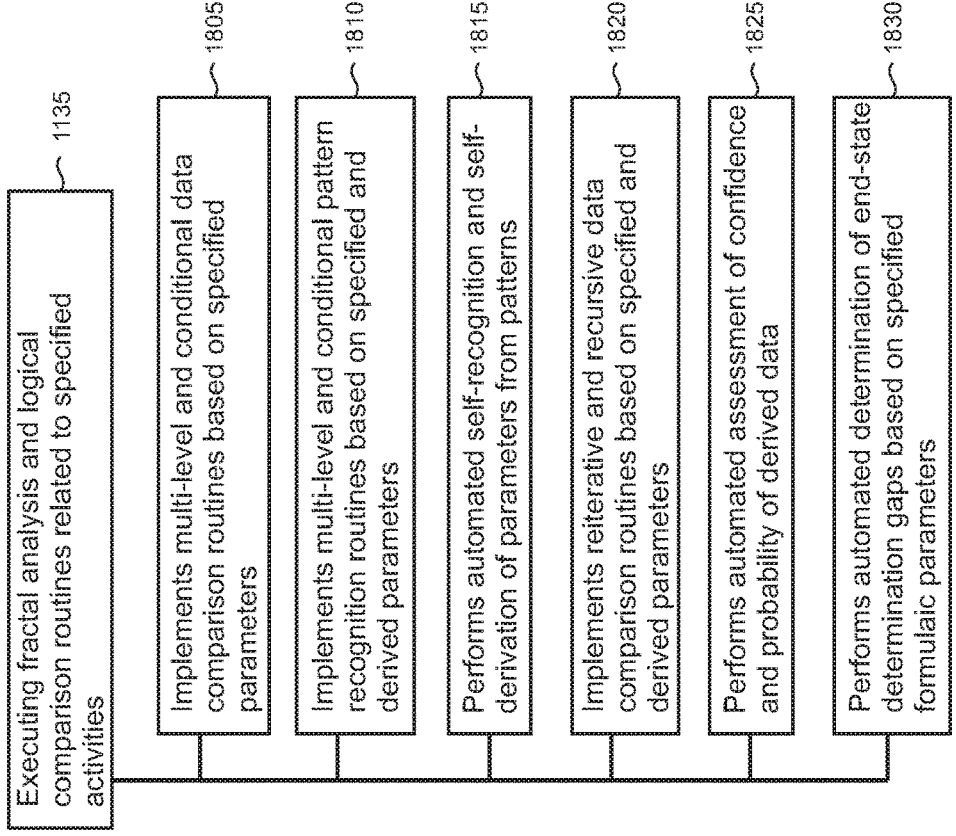
FIG. 18 shows a taxonomy of illustrative functionalities exposed by a tool for executing fractal analysis and logical comparison routines related to specified activities.

FIG. 18 shows a taxonomy of illustrative functionalities exposed by the tool 1135 for executing fractal analysis and logical comparison routines related to specified activities. The functionalities implement multi-level and conditional data comparison routines based on specified parameters (1805), implement multi-level and conditional pattern recognition routines based on specified and derived parameters (1810), perform automated self-recognition and self-derivation of parameters from patterns (1815), implement reiterative and recursive data comparison routines based on specified and derived parameters (1820), perform automated assessment of confidence and probability of derived data (1825), and perform automated determination of end-state determination gaps based on specified formulaic parameters (1830).

In an example using tool 1135, non-passed data fields indicating failed parameters may not necessarily indicate failed data for dates. Accordingly, the functionality 1805 implements the following routine:

```
Analyze non-passed data fields
    Categorize nature of flags and tags
        Analyze non-passed tags
            IF non-passed "ILLOGICAL" tags > 62%
                IF "ILLOGICAL DATE RANGES" > 62%,
                    Determine new data range
                    beginning delta from established
                    range and ending delta from
                    established range
                    Adjust data parameters table
                    entry – set flag = "ALT LOGIC
                    ACQUIRED"
                    Re-execute date validation using
                    Alt Logic
                        Tag passed data elements
                        (under alt routine) =
                        "PASSED ALT LOGIC
                        ACQUIRED"
```

Continuing with the example, functionality 1810 implements the following routine:

```
Analyze non-passed data fields
    Categorize nature of flags and tags
        Analyze non-passed tags
            IF non-passed "ILLOGICAL" tags > 62%
                IF "ILLOGICAL DATE RANGES" > 62%,
                    Determine new data range
                    beginning delta from established
                    range and ending delta from
                    established range
                    Adjust data parameters table
                    entry – set flag = "ALT LOGIC
                    DERIVED"
                    Re-execute date validation using
                    Alt Logic
                        Tag passed data elements
                        (under alt routine) =
                        "PASSED ALT LOGIC
                        DERIVED"
```

Continuing with the example, functionality 1815 implements the following routine:

```
Analyze passed Alternate Logic tagged data fields
    Categorize nature of passed acquired alternate flags and tags
        IF passed date tags > 91%
            IF "ILLOGICAL DATE RANGES" > 87%,
                Set dataset flag = VALIDATED ALT
                LOGIC
```

Continuing with the example, functionality 1820 implements the following routine:

```
If preceding routine <= 87% passed date tags due to date ranges
    Execute "Non-Passed Date Waterfall routine (descending scale of
    validation with variable re-tagging and, resultant, re-flagging
    based on confidence)
If preceding routine <= 91% passed date tags
    Execute "Non-Passed Date Waterfall" routine (using descending
    scale of validation with variable re-tagging and, resultant, re-
    flagging based on confidence)
```

Continuing with the example, functionality 1825 implements a routine in which the results from application of the routines implemented by functionalities 1805, 1810, 1815, and 1820 (i.e., flags and tags) and adjusted Routine Definition Attributes validation routines are employed to re-execute Validation until end-state parameters, using end-state-applicable Routine Definition Attributes Criteria table entry, are met. Functionality 1830 implements a routine in which Results which are acceptable, but include gaps to required confidence using end-state-applicable Routine Definition Attributes Criteria table entry, are flagged using end-state-applicable Routine Definition Attributes.

Figure 19:
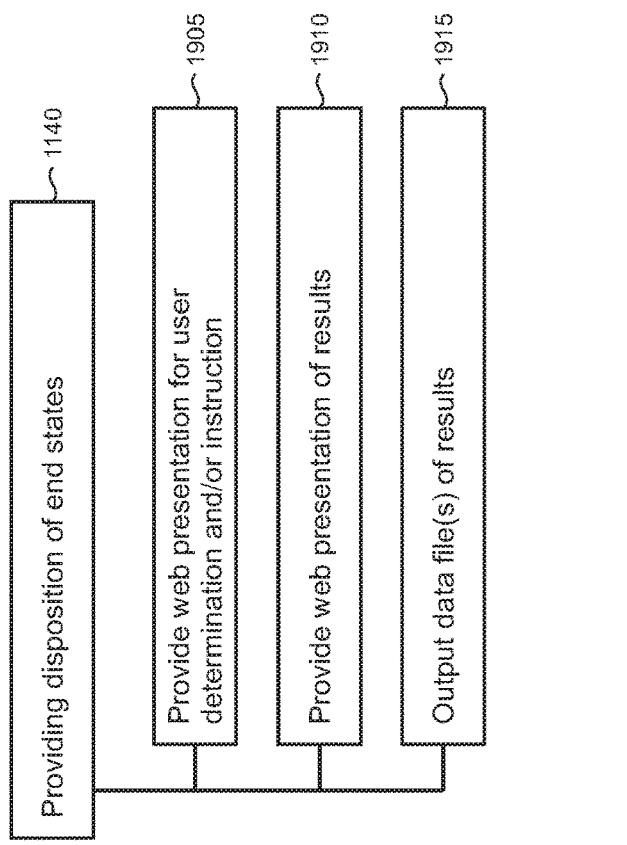
FIG. 19 shows a taxonomy of illustrative functionalities exposed by a tool for providing disposition of end states.

FIG. 19 shows a taxonomy of illustrative functionalities exposed by the tool 1140 for providing disposition of end states. The functionalities provide web presentation for user determination and/or instruction (1905). This functionality may be utilized, for example, to provide notices, errors and exceptions, display alerts, and show data, reports and the like to the end users 125 (FIG. 1) in cases where a determination by the end user may be needed. The functionality 1905 may also be configured to receive input and instructions from an end user in cases where user input or other instructions are needed by a tool or routine. Intermediate and end results may be presented using a functionality that provides for web presentation of results (1910). A functionality also provides for output of results (1915).

Figure 20:
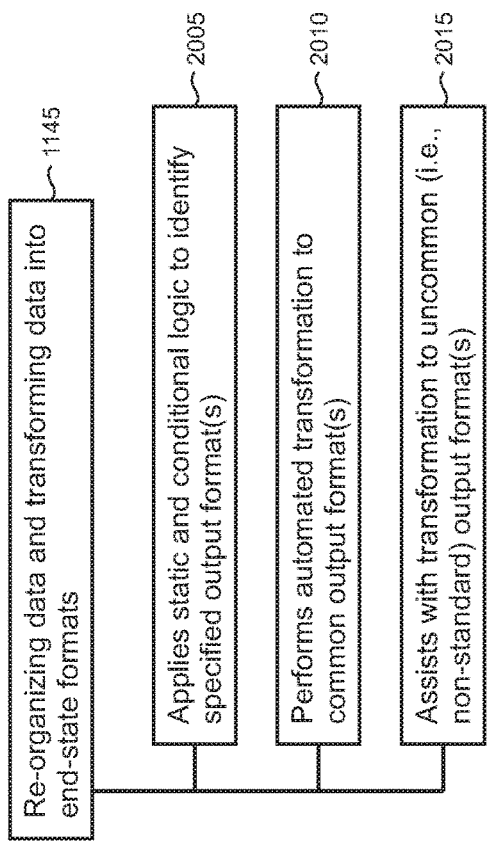
FIG. 20 shows a taxonomy of illustrative functionalities exposed by a tool for re-organizing data and transforming data into end-state formats.

FIG. 20 shows a taxonomy of illustrative functionalities exposed by the tool 1145 for re-organizing data and transforming data into end-state formats. The functionalities apply static and conditional logic to identify specified output format(s) (2005), perform automated transformation to common output format(s) (2010), and assist with transformation to uncommon (i.e., non-standard) output format(s) (2015).

Tool 1145 operates in a substantially similar manner to tool 330 described in the text accompanying FIGS. 3 and 9.

Figure 21:
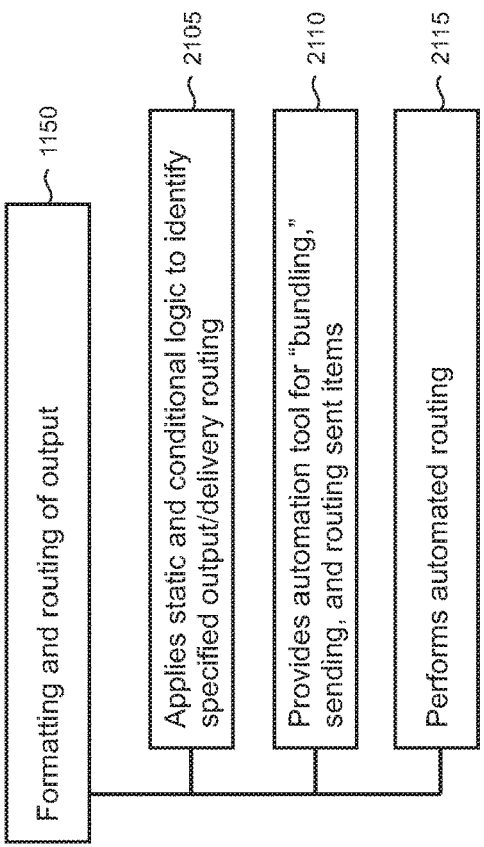
FIG. 21 shows a taxonomy of illustrative functionalities exposed by a tool for formatting and routing of output.

FIG. 21 shows a taxonomy of illustrative functionalities exposed by the tool 1150 for formatting and routing of output. The functionalities apply static and conditional logic to identify specified output/delivery routing (2105), provide an automation tool for "bundling," sending, and routing sent items (2110), and perform automated routing (2115). Tool 1150 operates in a substantially similar manner to tool 335 described in the text accompanying FIGS. 3 and 10.

Figure 22:
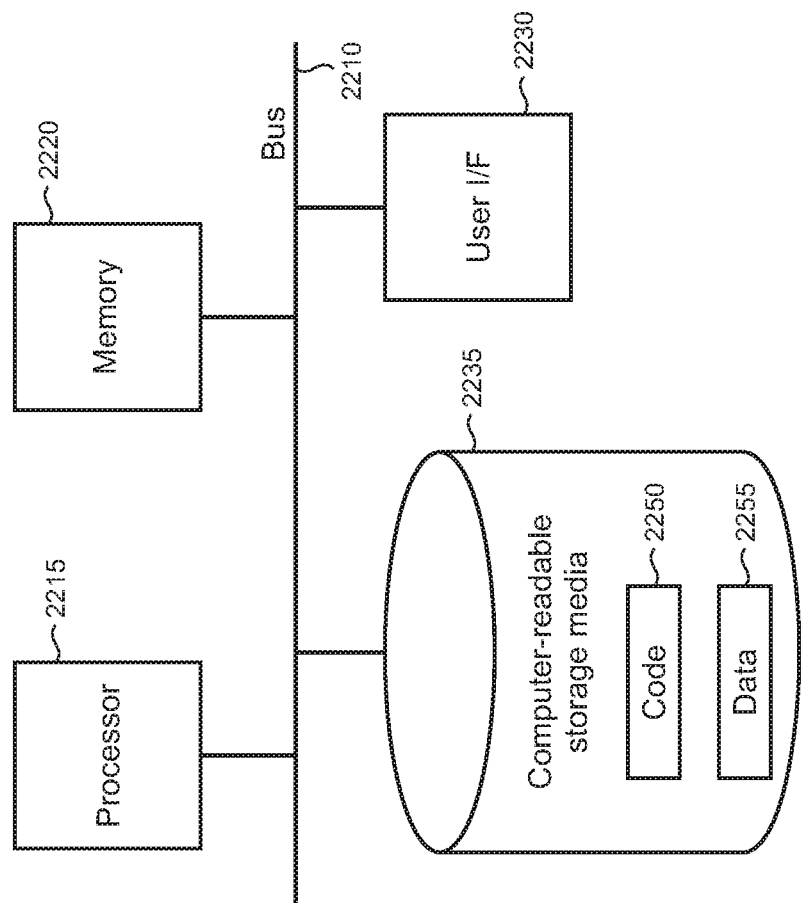
FIG. 22 is a simplified functional block diagram of an illustrative computing platform.

FIG. 22 shows a simplified block diagram of an illustrative computing platform, such as a server, personal computer, or client device that may be utilized to facilitate implementation of aspects of the present data gathering and re-presentation tools. A bus 2210 is used to operatively couple a variety of devices including a processor 2215, memory 2220, user interface (I/F) 2230, and computer-readable storage media 2235. Not shown are other common components such as power supplies and various circuits such as timing sources, peripherals, analog-to-digital and digital-to-analog converters, voltage regulators, and power management circuits, and the like which are well known in the art, and therefore, will not be described any further. The computer-readable storage media 2235 may be used, among other purposes, to store computer-executable instructions and code 2250 and data 2255.

Several aspects of computing systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include a computer-readable media in packaging materials. Those skilled in the art will recognize how best to implement the described functionalities presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more non-transitory computer-readable storage media storing instructions which, when executed by one or more processors disposed in an electronic device, implement a toolset usable by a service for data gathering and data re-presentation, automated tools in the toolset performing a method comprising the steps of:

interfacing with one or more systems having a proprietary database storing data, a format for the data being recognized and verified;

recognizing and parsing data in the proprietary database and responsively categorizing the data into generic transaction types;

analyzing data acquired from the proprietary database to determine whether to enrich the data acquired from the proprietary database with data acquired from one or more other sources;

identifying a source among the one or more other sources from which to acquire the data for enriching;

acquiring the data for enriching from the identified source;

identifying data that is missing from either the proprietary database or data acquired from the one or more other sources;

deriving data to fill in for the identified missing data;

editing and validating recognized and derived data, the derived data including derivations of the enriching data acquired from the identified other sources, wherein the validating includes one or more fractal analyses configured for implementing each of comparison, pattern recognition, and confidence assessment for each element of acquired and derived data, and for combinations of data elements, in which combinations comprise related data elements and the fractal analyses applied to combinations are multi-level.

2. The one or more non-transitory computer-readable storage media of claim 1 in which the step of interfacing further includes the steps of navigating to the one or more systems, securely logging in to a system, and using system-appropriate protocols, data structures, or data types while performing the interfacing.

3. The one or more non-transitory computer-readable storage media of claim 1 in which the step of recognizing and parsing further includes the steps of utilizing a table of possible source data transaction types, utilizing a table of generic translations of source data transaction types to external presentation transaction types, and utilizing a table of external presentation specifications, each of the tables being specified by a client to the service.

4. The one or more non-transitory computer-readable storage media of claim 1 in which the step of editing and validating further includes the steps of validity-checking the acquired data against global or activity-type parameters, validity-checking and logic-checking the acquired data against date type parameters, validity-checking and logic-checking of acquired data against input parameters or other constants, and validity-checking and logic-checking of derived data.

5. The one or more non-transitory computer-readable storage media of claim 1 in which the step of identifying further includes the steps of initiating other automated routines outside the toolset and initiating other automated routines within a tool in the toolset.

6. The one or more non-transitory computer-readable storage media of claim 1 in which the step of deriving further includes the steps of deriving running balances, deriving missing transaction data, and deriving missing status data.

7. The one or more non-transitory computer-readable storage media of claim 1 including a further step of re-organizing and transforming data into end-state formats.

8. The one or more non-transitory computer-readable storage media of claim 7 in which the re-organizing further includes the steps of applying static and conditional logic to identify specified output formats, performing automated transformation to common output formats, and performing transformations to non-standard output formats.

9. The one or more non-transitory computer-readable storage media of claim 1 further including a step of formatting and routing comprising applying static and conditional logic to identify specified output or delivery routing, and providing for bundling, sending, and routing of sent items.

10. The one or more non-transitory computer-readable storage media of claim 1 in which data is enriched by accessing a bankruptcy court's PACER system to acquire additional information which a service provider does not have and re-presenting the data by applying defined specifications and a form template.

11. The one or more non-transitory computer-readable storage media of claim 1 in which the data is enriched by accessing a database associated with the National Data Center.

12. The one or more non-transitory computer-readable storage media of claim 1 in which the source is a proprietary database associated with a client.

13. The one or more non-transitory computer-readable storage media of claim 1 in which the source is associated with a third party who is not a client or service provider.

14. The one or more non-transitory computer-readable storage media of claim 1 in which a client initiates orders and receives data and output from the service using a web-enabled application that executes on a client device.

* * * * *